Oct. 28, 1930.  T. GILLMANN  1,779,969
SAW FILING DEVICE
Filed May 2, 1929  2 Sheets-Sheet 1
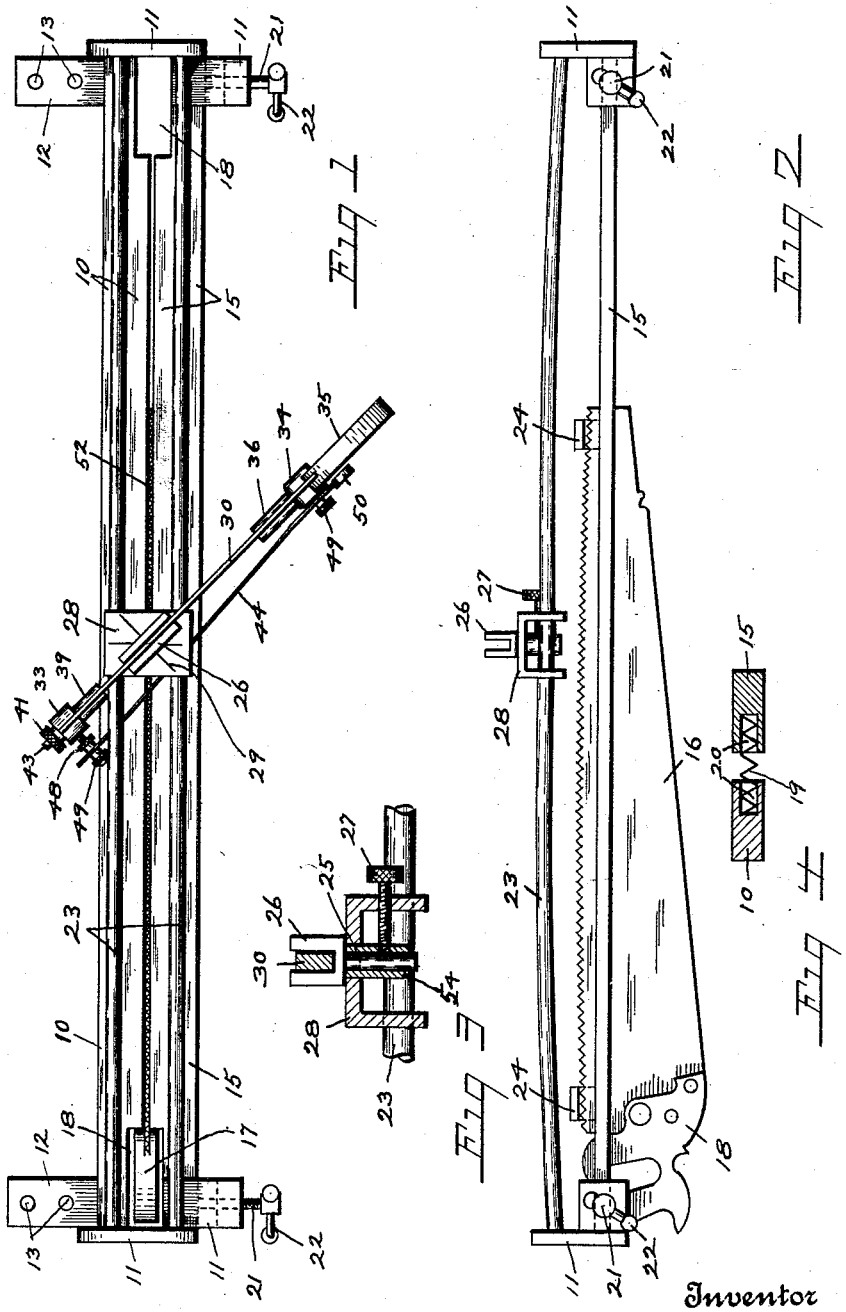
Inventor
Thomas Gillmann
By his Attorney
John J. Thompson Oct. 28, 1930.  T. GILLMANN  1,779,969
SAW FILING DEVICE
Filed May 2, 1929  2 Sheets-Sheet 2
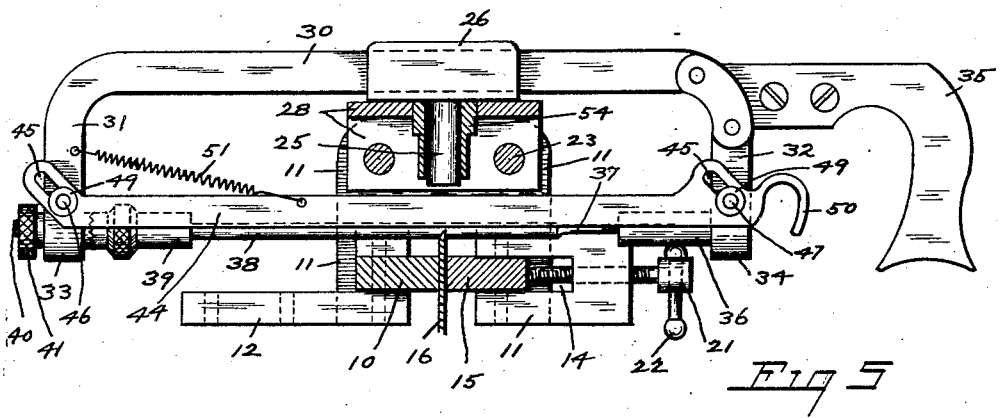
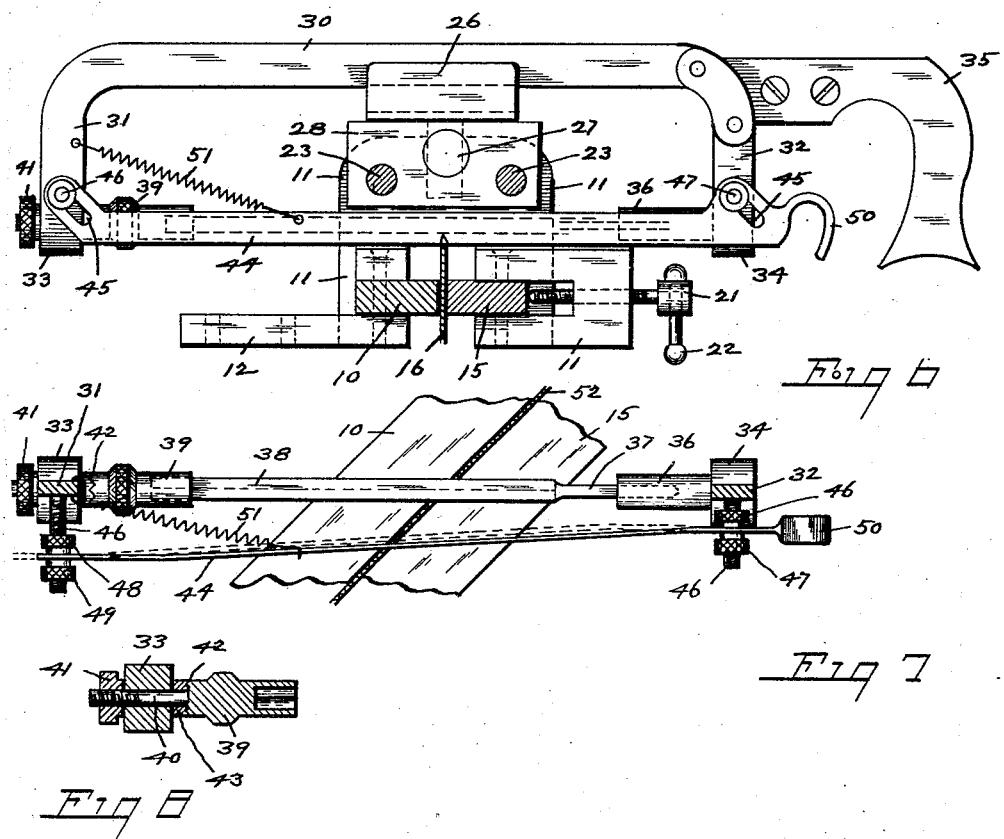
Inventor
Thomas Gillmann
By his Attorney
John J. Thompson Patented Oct. 28, 1930

1,779,969

UNITED STATES PATENT OFFICE

THOMAS GILLMANN, OF POUGHKEEPSIE, NEW YORK

SAW-FILING DEVICE

Application filed May 2, 1929. Serial No. 359,774.

This invention relates primarily to a device for filing hand saws, but with slight changes it may be employed for filing the teeth of larger saws and also band saws, but the primary object is to provide a device in which a hand or carpenter saw may be held during the operation of filing the teeth, and means provided whereby the teeth are filed on the proper angle and all to an even depth.

In the usual method employed in the sharpening or filing of saw teeth by hand, it is very difficult not only to file all of the teeth on the same angle, but to produce teeth of the same depth, the operation depending on the skill of the operator.

The object of this invention is first to provide means for holding the saw in the proper position, second to provide a holder for the usual three cornered file, third, to so mount this holder as to be in proper relation to the teeth of the saw and by a novel arrangement of parts to be brought into contact with a file a tooth during its forward stroke, and during its backward stroke to be raised out of engagement with the teeth, and brought into position to file the next tooth on the next forward stroke, and lastly to provide means whereby the file holder may be adjusted to file the teeth at a predetermined angle.

With these and other objects in view, my invention consists in certain construction and combination of parts as will hereinafter be fully described and claimed and fully illustrated in the accompanying drawings which form a part hereof and in which like figures of reference refer to corresponding parts in all of the views, but it is fully understood that slight changes may be made without departing from the spirit of the invention.

In the drawings:

Figure 1 is a top plan view of the device and shows a hand saw clamped in position for filing.

Figure 2 is a front side elevation of the same, but with the saw holding frame removed from the carrier.

Figure 3 is an enlarged view of the carrier, partly in section to show its construction.

Figure 4 is an enlarged cross sectional view of the clamping jaws, illustrating the method employed to normally retain the same in an open position.

Figure 5 is an enlarged cross sectional view of the device showing the position of the same during a forward or operative stroke.

Figure 6 is a similar view, but showing the position of the parts during a backward stroke when the file is raised from contact with the teeth.

Figure 7 is a partial plan view, with the upper portion of the file frame removed, to show the file and the trip arm.

Figure 8 is a sectional view of the file holding socket.

Referring to the drawings:

Taking first the saw holding clamp, this comprises the stationary jaw 10 which has its ends secured to the end brackets 11 in some suitable manner; said end brackets 11 being formed with legs or arms 12 provided with holes 13 for the use of screws or other means to attach the device to a table or bench (not shown) and there also may be other arms placed at suitable distances apart and secured to said jaw 10.

The end brackets 11 are formed with slots 14 (see Figures 5 and 6) and within these slots is mounted the movable jaw 15, which may be formed with a curved inner edge to provide a positive grip on the blade of the saw 16 which is placed between said jaws 10 and 15, with the handle 17 within a cutout portion 18 in the jaws.

For opening the jaws when released, there is provided a spring 19 mounted in alined recesses 20 formed in the adjacent edges of the jaws 10 and 15 (see Figure 4), and for clamping said jaws 10 and 15 upon the saw blade 16 the end brackets 11 are provided with the screws 21 threaded therein with their inner ends in contact with the outer edge of the movable jaw 15, and provided with the handles 22.

Above the jaws 10 and 15 are mounted two guide rods 23 which have their ends secured in the brackets 11 and which are slightly curved upward to conform to the proper curve of the teeth of a saw from end to end; and when the saw is inserted between the jaws 10 and 15, the two gages 24 are employed to gage the distance from the ends of the teeth to the surface of the jaw 15, so that as the teeth are filed they will all be of the same length.

Mounted on said rods 23 in a freely slidable manner from end to end is a carrier which is U-shaped and provided with holes through which the rods 23 pass, and with a vertical bearing 24 (see Figure 3) within which is mounted a shaft 25 upon the upper end of which is formed a U-shaped guide 26; said shaft being locked in position by a screw 27 threaded into said bearing 24, and the upper surface of said carrier 28 is provided with graduations 29 so that the guide 26 may be set and secured at the desired angle with relation to the teeth of the saw.

The file holding and operating device comprises a frame similar to the usual hack-saw frame and composed of a back 30 having the depending portions 31 and 32 terminating in the enlarged portions 33 and 34; the back 30 being provided with the handle 35.

To the enlarged portion or boss 34 is secured a stud 36 which is adapted to receive and hold the tang 37 of the file 38; while the point or other end of the file is held in a member 39 (see Figure 8) which is provided with a shaft 40 formed with threads for a locking nut 41; said shaft 40 being passed through a hole in the portion 33 of the frame.

The end of the member 39 adjacent the shaft 40 is formed with teeth 42 coacting with similar teeth formed on a washer 43 which is secured to the boss or member 33, and formed with a central hole for the shaft 40, in such a manner that the file 38 may be set so that its cutting face is at an angle to give the teeth of the saw the desired rake; the stud 36 and member 39 being turned, the teeth 42 intermeshed and the nut 41 tightened.

It will be noted from the drawings that the back 30 of the file frame is mounted in the guide 26 in a freely slidable manner, and the direction or angle of travel with respect to the saw teeth is governed by the angle at which the guide 26 is set with relation to the graduations 29 on the carrier.

For raising the file from contact with the saw teeth during the backward stroke of the frame, and for guiding the file to the next tooth to be filed there is provided a trip arm 44 which is formed near its ends with the two angular slots 45, by which said trip arm 44 is mounted on the studs 46 and 47 which project at right angles from the frame, and which are threaded and provided with the adjusting nuts 48 and the lock nuts 49. Said trip arm 44 is also provided with a finger grip 50 and a spring 51 for normally retaining the same in its outward position.

It will also be noted that said trip arm 44 is bent or off-set and is placed at an angle with relation to the file 38, and by the nuts 48 and 49 the distance between the same may be adjusted to correspond with the size of the tooth of the saw, or points to the inch.

In the operation of the device, the saw having first been secured in the jaws, and the guide 26 set on the desired angle, and the point of the file engaging the V between two teeth, the frame is pushed forward thus filing one edge of each of two adjacent teeth in the usual manner.

Now on the return or back stroke, the finger grip 50 is pulled back against the action of the spring 51, and by the action of the slots 45 on the studs 46 and 47 the frame will be raised as shown in Figure 6; the trip arm 44 sliding between two teeth and the file raised from contact therewith, and at the same time due to the angle of said trip with respect to the file the frame and carrier will be moved on the rods 23 and the file brought over the next teeth to be filed, so that on the forward stroke when the file drops into engagement with the teeth the next in order will be filed, and this action is repeated until all of the saw teeth are filed.

Having thus described my invention, what I claim as new and desire to secure by Letters Patent, is:

A saw filing device, comprising a clamp for holding the saw, end brackets attached to said clamp and being formed with attaching means, guide rods having their ends secured in said brackets and mounted above said clamp and in curved relation thereto, a carriage mounted on said guide rods and adapted to slide thereon a guide pivoted in said carriage, means for setting said guide at an angle with respect to said clamp and retaining the same in place, a frame slidably mounted in said guide and adapted to be reciprocated therein, a file mounted in said frame in an adjustable cutting relation with the saw teeth, and means carried by said frame for raising the file out of cutting contact with the teeth, and for spacing or setting said file for the next cut.

In testimony whereof I affix my signature.

THOMAS GILLMANN.